Dec. 25, 1923.
A. E. BUTKOVICH
SOLDERING IRON
Filed May 11, 1922
1,478,868
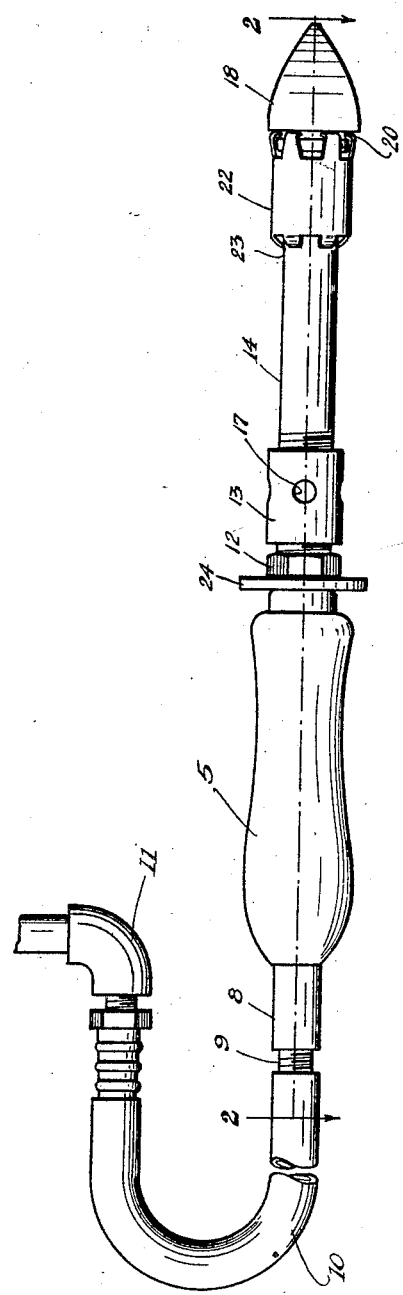
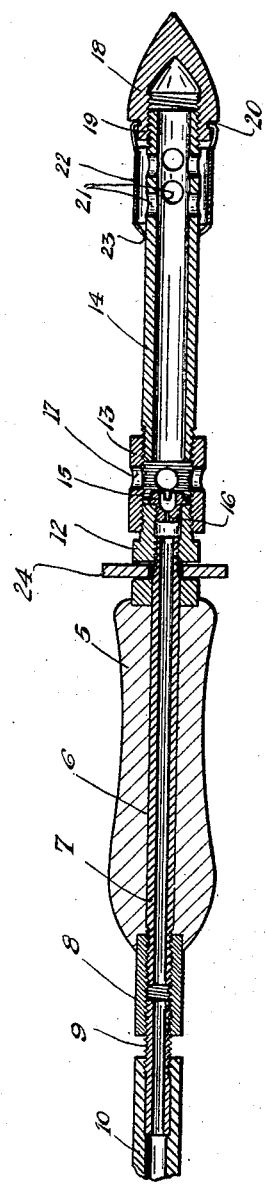
Witnesses:
Inventor
Anton E. Butkovich
By Joshua R. H. Potts
His Attorney Patented Dec. 25, 1923.

1,478,868

UNITED STATES PATENT OFFICE.

ANTON E. BUTKOVICH, OF CHICAGO, ILLINOIS.

SOLDERING IRON.

Application filed May 11, 1922. Serial No. 560,196.

*To all whom it may concern:*

Be it known that ANTON E. BUTKOVICH, a former subject of the King of Austria, who has forsworn his allegiance to said King of Austria and declared his intention of becoming a citizen of the United States, and therefore is not now a citizen or subject of any country, and is a resident of the city of Chicago, county of Cook, and State of Illinois, has invented certain new and useful Improvements in Soldering Irons, of which the following is a specification.

My invention relates to new and useful improvements in soldering irons, and has for its principal object the provision of an improvement of this character which will be highly efficient in use and one that is especially designed for household use.

Other objects will appear hereinafter.

The invention consists in the combinations and arrangements of parts hereinafter described and claimed.

The invention will be best understood by reference to the accompanying drawings forming a part of this specification, and in which, Fig. 1, is a side elevational view of a soldering iron embodying the invention, Fig. 2, is a sectional detail view of the same taken substantially on line 2—2 of Fig. 1.

Referring to the drawing illustrating the preferred form of construction 5 indicates a handle having a longitudinal extending passage 6 formed therein and in which a pipe 7 is mounted. One end of the pipe 7 carries a nipple 8 partially imbedded in the adjacent end of the handle 5, as shown, said nipple in turn carries a stud pipe 9 to which a hose 10 is connected, said hose leads to a suitable gas supply pipe 11. The opposite end of the pipe 7 carries a plug 12 screw-threaded in a nipple 13 carrying a hollow support 14. Screw-threaded in the plug 12 is a tip 15 having a small central opening 16 formed therethrough for the escape of the gas from the pipe 7. Air is admitted into the support 14 through a plurality of openings 17 formed in the nipple 13, as shown, said openings also serving to facilitate igniting the gas as the same passes through the pipe 7 into the hollow support 14. The outer end of the pipe 14 carries a hollow soldering bit 18, as shown, said soldering bit being provided with a hub 19 having an annular recess 20 formed therein. Formed in the support 14 adjacent the soldering bit 18 are a plurality of openings 21 through which the flame passing through the support 14 is permitted to escape.

The escaping of the flame from the support 14 is regulated by a collar 22 embracing the support in spaced relation with respect thereto, as shown, said collar having its side edges serrated adapted to engage the support 14 as at 23 and the recess 22, as shown. As the flame passes through the support 14 into contact with the bit 18 the flame passes through the openings 21 and through the serrated side edges of the collar 22. Carried by the pipe 7 adjacent the handle 5 and the plug 12 is a hand guard 24 of non-combustible material which is adapted and arranged to protect the hand from coming into contact with the metal parts of the soldering iron.

The hose 10 supplies the gas from the gas supply pipe 11 through the pipe 7 where it is ignited after passing through the tip 15. The flame then passes through the support 14 into contact with the soldering bit 18 heating the same and then through the openings 21. As shown the bit 18 is screw-threaded on the support 14, this construction being such that various sizes of soldering bits can be mounted on the support as desired.

My improved soldering iron is especially designed for the individual's use around the home and is designed in such a manner that the fuel for heating the soldering bit is artificial gas used for illuminating and heating the home. The simplicity of the construction of my improved soldering iron is of such a nature that the cost of manufacturing the same is comparatively small and the same can be placed upon the market at a reasonable price.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A soldering iron including a handle, a conduit carried by said handle and having a perforated outer end portion, means for directing a flame through said conduit, a hollow bit carried by said conduit and having an annular recess formed therein, and a flame guard surrounding the perforated end of said conduit and having its side edges serrated for engagement with said conduit and said recess.

2. A soldering iron including a handle, a conduit having a perforated end portion, means for directing a flame through said conduit at the perforated end thereof, a soldering bit carried by said support, and a guard surrounding the perforated end of said conduit and having its side edges serrated for engagement with said conduit and said soldering bit.

3. A soldering iron including a conduit through which a flame is adapted to be directed and having a perforated end portion, a soldering bit at the end of the conduit and provided with an annular recess, and a member surrounding the conduit and having serrated edge portions engaging the recess.

4. A soldering iron of the class described comprising a handle; a fuel pipe passing through said handle, one end of said fuel pipe adapted to be attached to a supply hose; a plug carried by said pipe; a hollow conduit carried by said plug and in communication with said pipe, there being a plurality of openings formed in said conduit for the escape of a flame passing therethrough; a soldering bit carried by said conduit, there being an annular recess formed in said soldering bit; and a collar surrounding said conduit in spaced relation with respect thereto for checking the escape of the flame through said openings, the side edges of said collar being serrated and engaging said conduit and said recess.

In testimony whereof I have signed my name to this specification in the presence of two subscribing witnesses.

ANTON E. BUTKOVICH.

Witnesses:
FREDA C. APPLETON,
MARGARET AUER.